Jan. 24, 1939.  K. D. KYSOR  2,145,089
FRONT WHEEL DRIVE FOR AUTOMOTIVE VEHICLES
Filed April 20, 1936  2 Sheets-Sheet 1

INVENTOR
Karl D. Kysor.
BY
ATTORNEY

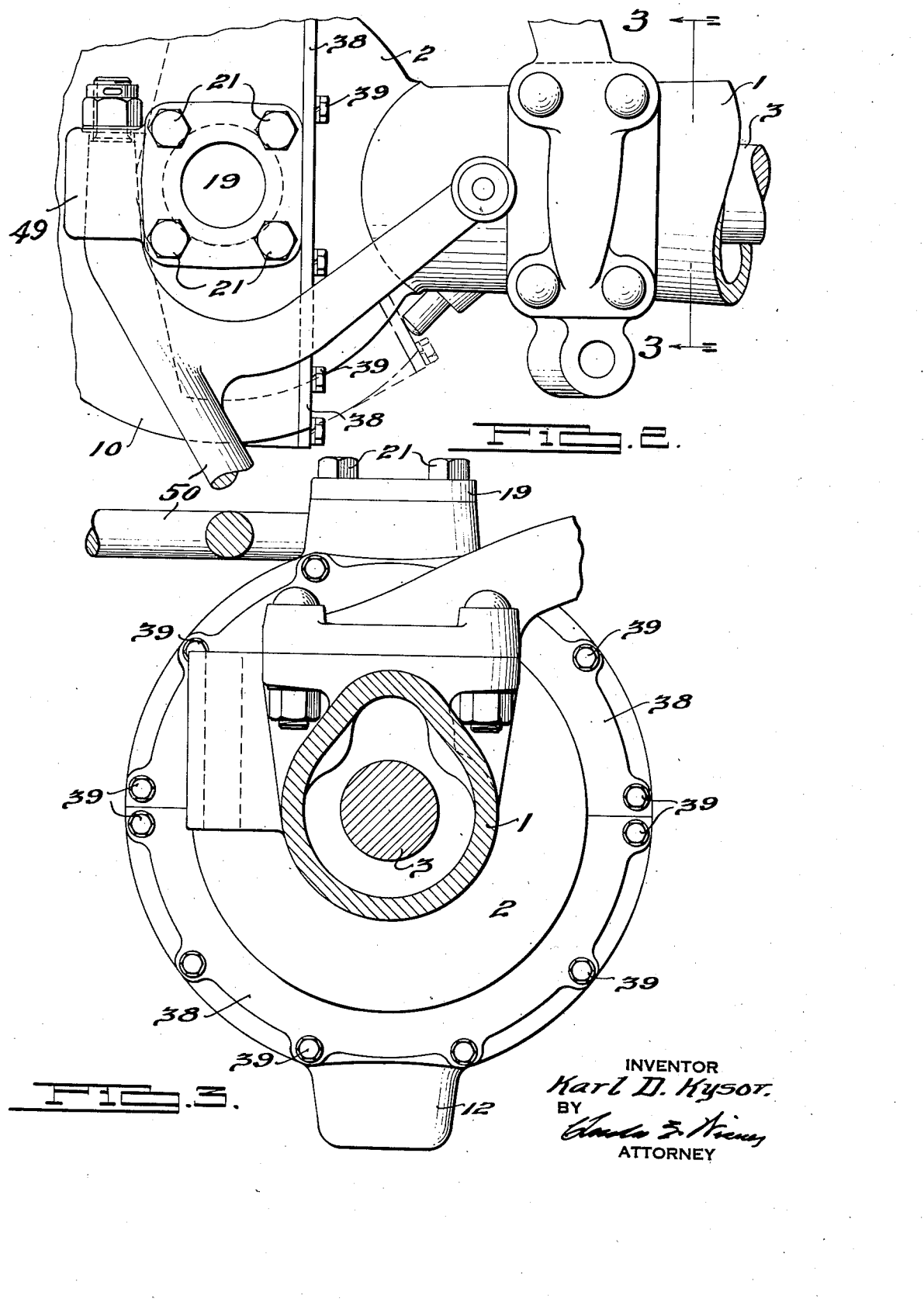

Patented Jan. 24, 1939

2,145,089

UNITED STATES PATENT OFFICE 2,145,089

FRONT WHEEL DRIVE FOR AUTOMOTIVE VEHICLES

Karl D. Kysor, Northville, Mich.

Application April 20, 1936, Serial No. 75,277

10 Claims. (Cl. 180—43)

This invention relates to front wheel drives for automotive vehicles and the object of the invention is to provide a front wheel which is pivotally mounted on an axle housing to be turned in steering the vehicle, said wheel being driven through the pivot at any angle to which the wheel is turned on its pivot.

Another object of the invention is to provide a universal joint through which the wheel is driven and in which the center of the universal joint intersects the steering axis of the wheel, the joint being so arranged as to maintain a constant angular velocity relation between the wheel and axle shafts.

Another object of the invention is to provide a front wheel drive including a universal joint through which the wheel is driven, the parts being so arranged as to prevent separating strains from being applied to the universal joint.

A further object of the invention is to provide an axle housing having a semi-spherical end pivotally mounted in a semi-spherical portion of the wheel spindle, the parts being sealed in assembled relation to enclose the universal joint and the sealed parts being arranged to be filled with lubricant to maintain the universal joint and axle bearings as well as the wheel pivot properly lubricated at all times from a common source.

Another object of the invention is to provide a drive shaft and stub shaft and a ball mounted between the ends of the two shafts, the parts being so arranged that the stub shaft may be adjusted to maintain a desired pressure on the ball between the ends of the stub shaft and drive shaft and allow the stub shaft to be turned to any desired angle in relation to the drive shaft, the universal joint providing for a constant velocity drive about the ball in rotating the stub shaft and the ball forming the center of the universal joint.

Another object of the invention is to provide a unique pivot connection between the axle housing and stub shaft housing whereby the two housings may be quickly and easily assembled and, at the same time, will rigidly and firmly support the wheel for turning movement in relation to the axle housing in the steering operation.

A further object of this invention is to provide a construction by which the spherical shaped axle ball end is one piece and integral with the axle housing itself and similarly where the wheel spindle ball end is one piece and integral with the axle spindle proper. This highly desirable feature is made possible by the method of assembly which is hereinafter described.

A further object of the invention is to provide a means whereby the weight of the vehicle itself is carried by metal in compression instead of by cap screws or bolts in tension with their threads in shear.

A still further object accrues from the fact that the wheel spindle ball and axle ball ends are integral members without separating lines, making commercially practical the use of a steering pivot axis considerably inclined to the vertical axis of the wheel so that the center line of the pivot produced can be made to intersect the center line of the tire contact with the ground.

These objects and the several novel features of the invention are hereinafter more fully described and claimed and the preferred form of construction by which these objects are attained is shown in the accompanying drawings in which—

Fig. 2 is a plan view of the end of the axle housing and the corresponding portion of the wheel spindle.

Fig. 3 is a section taken on line 3—3 of Fig. 2.

Figure 1:
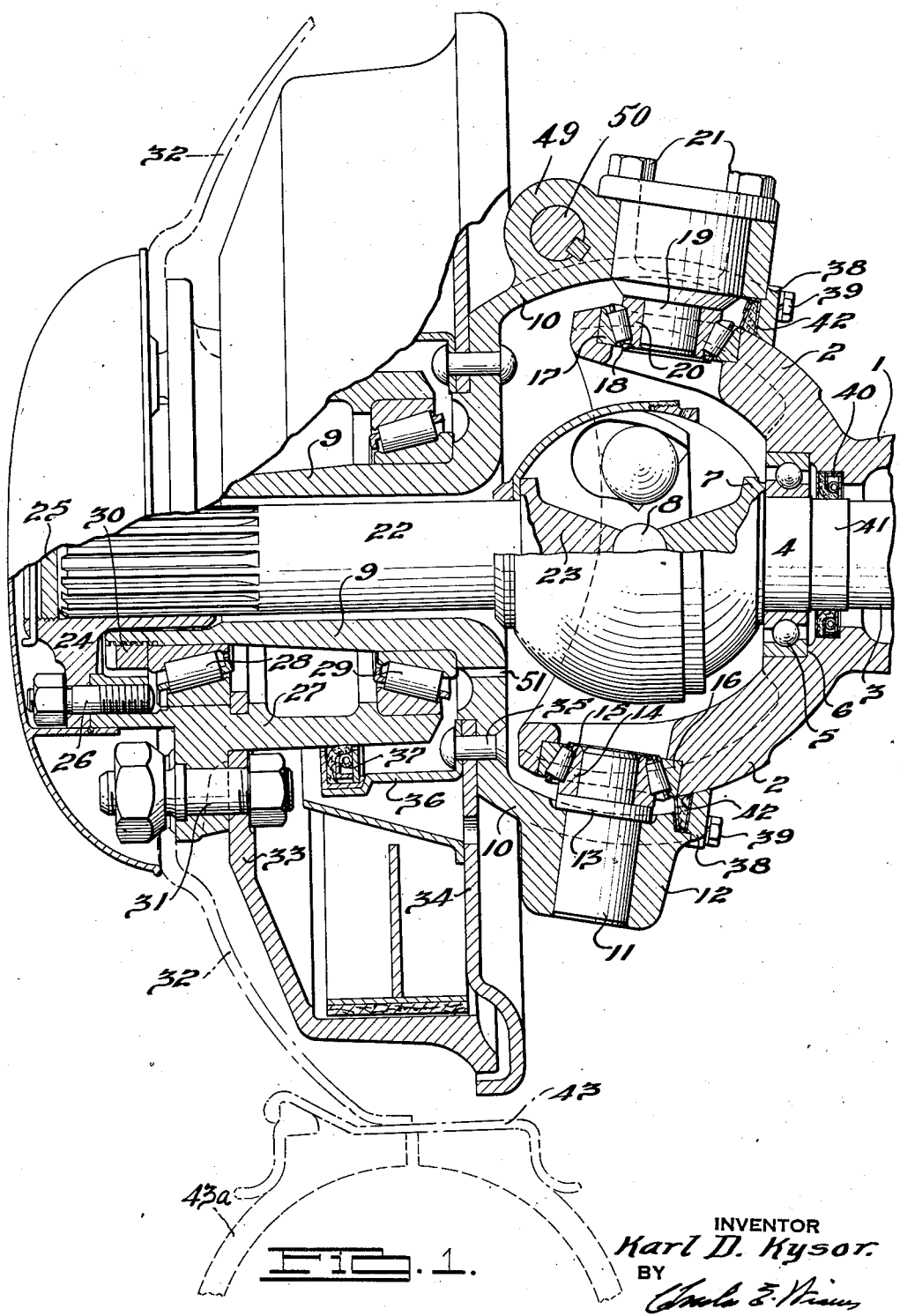
Fig. 1 is a sectional view through the driven wheel and its pivot.

As shown in Fig. 1, the axle housing 1 is provided with an integral semi-spherical end 2. The axle 3 is rotatably mounted in the housing 1 and is provided with a portion 4 fitting within the inner race of the ball thrust bearing 5 which has an outer race seating in the axle housing 2 and against the shoulder 6 of the axle housing. The axle 3 is provided with a shoulder on the end 7 engaging against the inner race of the thrust bearing 5 and this end 7 is provided with a semi-spherical seat engaging against the ball 8 shown in Fig. 1. The wheel spindle 9 is provided with a semi-spherical extension 10 and a pivot pin 11 is positioned in a boss 12 provided in the lower portion of the semi-spherical extension 10. This pin 11 is provided with a shoulder 13 and the inner race 14 of the pivot bearing is pressed over the upper end of the pin 11.

The rollers 15 are held in place on the inner race or cone 14 by the separator while the outer race 16 is pressed into the semi-spherical end 2 of the axle housing. At the same time, the outer race or cup 17 of the upper pivot bearing is pressed into its recess in the member 2.

However, before the upper pivot pin 19 is inserted in position, the wheel is moved to position the member 10 over the member 2 but the wheel is dropped down so that the rollers 15 on the lower pin 11 may be moved beneath the member 2 and up into the outer race 16, at which time, the upper pivot pin 19 carrying the inner bearing race 20 and rollers 18 may be inserted through the top of the member 10. It is important that the axis of the stub shaft 22 be maintained in approximately parallel relation with the axis of the axle shaft 3 during this assembling operation. This upper pivot pin is then secured in position in the member 10 by the cap screws 21 which are threaded into the member 10 as shown in Figs. 1, 2 and 3.

The stub shaft 22 is provided with an end 23 similar to the end 7 of the axle shaft and this end 23 is provided with a semi-spherical recess fitting the surface of the ball 8. The opposite end of the stub shaft is splined as shown and a splined driving dog 24 is fitted over the splined end of the stub shaft 22. This driving dog is provided with internal threads as shown at the extreme left of Fig. 1 and a position nut 25 is threaded into these threads and engages the end of the stub shaft to hold the opposite end 23 in engagement with the ball 8. This nut 25 may thus be turned up to positively locate the center of the universal joint as the threading of this nut into the driving dog will move the stub shaft 22 to the right of Fig. 1 moving the end 23 into engagement with the ball 8. The driving dog 24 carries a series of studs 26 which are secured in the wheel hub 27 so that rotation of the splined stub shaft and driving dog rotates the wheel hub. This wheel hub is rotatably mounted on roller bearings 28 and 29 which are mounted on the wheel spindle 9 and a nut 30 is threaded onto the end of the wheel spindle to hold the roller bearing 28 in position on the spindle and also may be adjusted to compensate for wear on the wheel bearings. The wheel hub 27 carries a series of hub bolts 31 by means of which the wheel 32 is secured to the hub and it is also to be noted that the brake drum 33 is also secured to the hub by these bolts. A stationary brake spider 34 is secured to the wheel spindle by means of the rivets 35 and these rivets 35 also support an oil seal housing 36 carrying an oil seal 37 of any approved construction which provides a seal between the housing 36 and the wheel hub 27. It is also to be noted that an oil seal 42 is secured to the semi-spherical wheel spindle extension 10 by the steering ball seal plate 38 which is secured to the housing 10 by the screws 39 shown in Figs. 1 and 3. This oil seal 42 fits the semi-spherical end 2 of the axle housing 1 and provides a seal against the ground surface of the member 2 and it is also to be noted that an oil seal 40 is provided behind the thrust bearing 5 and seals against a cylindrical surface 41 on the drive shaft 3. This seal 40 prevents leakage between the axle housing 1 and the drive shaft and by means of the three oil seals 37, 40 and 42 the entire unit is sealed against oil leakage so that this entire unit may be filled with lubricant to lubricate all the parts and provide a sealed lubricated unit containing excess lubricant which need not be replenished except at long intervals.

It is also to be noted that the axis of the pivot pins 11 and 19 intersects the center of the ball 8 and if this axis were extended it would come well within the tire 43ª mounted in the rim 43 of the wheel. By bringing this point well within the tire, ease of steering is assured as well as proper control of the steering wheels in all positions.

The universal joint connecting the axle shaft 3 and stub shaft 22 may be of any approved type but is preferably a constant velocity joint in order that the stub shaft 22 may be driven at the same speed as the axle shaft 3 in its different positions. There are several well known types of joints which may be used in this front wheel drive though some are more effective than others. The important points of the construction are that the center of the ball 8 be at the true center of the universal joint and also be at a point intersected by the axis of the pivot pins 11 and 19; that both ball ends are of one-piece construction; that the vehicle weight is carried by the steel shoulder 13 in compression and not by screws in tension and shear and that this construction makes commercially possible the use of inclined steering pivots in a power driven axle. It is also to be noted that this construction prevents separating strains from being applied to the universal joint due to the fact that all separating strains are taken care of between the semi-spherical ends of the axle housing and wheel spindle by the pivot pins 11 and 19 and this construction allows the stub shaft and axle shaft ends to be maintained in firm engagement against the ball 8 by the setting of the position nut 25.

By arranging the axes of the pivot pins 11 and 19 at an angle to the plane of the wheel, room is provided at the top of the semi-spherical portion 10 of the wheel spindle 9 for a boss 49 in which the steering arm 50 may be secured. By connecting this steering arm inside of the pivot, better steering action may be obtained and, at the same time, the connection is direct to the member to be steered and compact and out of the way.

While the lubricant within the semi-spherical ends 2 and 10 may pass between the stub shaft 22 and wheel spindle 9 and hub of the driving dog 24 to the bearings 28 and 29, it may also be desired to provide several apertures 51, as shown in Fig. 1, to allow direct passage of lubricant to or from the bearings 28 and 29 as shown in Fig. 1.

From the foregoing description it becomes evident that the device is very efficient in operation, provides an exceptionally strong construction which will not allow separation of the universal joint, will rigidly support the wheel and provides a device which accomplishes the objects described.

Having thus fully described my invention, its utility and mode of operation, what I claim and desire to secure by Letters Patent of the United States is—

1. A front wheel drive for automotive vehicles comprising an axle housing having a semi-spherical end, a wheel spindle having a semi-spherical end, pivot pins connecting the semi-spherical ends of the axle housing and wheel spindle, a shaft rotatably mounted in the axle housing, a stub shaft rotatably mounted in the wheel spindle, a ball positioned between the ends of the axle shaft and stub shaft and within the semi-spherical ends of the axle housing and wheel spindle, a universal joint connecting the axle shaft and stub shaft, means for adjusting the stub shaft longitudinally in the spindle, the pivot pins between the semi-spherical ends of the axle housing and wheel spindle preventing separation of the parts and the stub shaft being longitudinally adjustable to maintain a firm bearing on the ball between the ends of the stub shaft and axle shaft and prevent relative longitudinal displacement of the stub shaft and axle shaft.

2. A front wheel drive for automotive vehicles comprising an axle housing having a semi-spherical end, a wheel spindle having a semi-spherical end, a wheel rotatably mounted on the spindle, pivot pins connecting the semi-spherical ends of the axle housing and wheel spindle, a shaft rotatably mounted in the axle housing, a stub shaft rotatably mounted in the wheel spindle, a ball socketed between the opposed ends of the axle shaft and stub shaft and within the semi-spherical ends of the axle housing and wheel spindle, a universal joint connecting the axle shaft and stub shaft, means for adjusting the stub shaft toward the axle shaft to maintain working engagement with the ball, the axle shaft being relatively non-adjustable, and sealing means between the semi-spherical ends of the axle housing and wheel spindle and between the axle and axle housing and between the spindle and wheel whereby the semi-spherical ends of the axle housing and wheel spindle may be filled with excess lubricant to maintain the parts lubricated.

3. A front wheel drive for automotive vehicles comprising an axle housing having a semi-spherical end, a wheel spindle having a semi-spherical end fitting over the semi-spherical end of the axle housing, a pair of pivot pins carried by the semi-spherical spindle end and pivotally mounted in the semi-spherical end of the axle housing, an axle rotatably mounted in the axle housing, a stub shaft rotatably mounted in the spindle, a universal joint connecting the axle shaft and stub shaft, a ball positioned between the ends of the stub shaft and axle shaft, the ends of the said shafts being shaped to fit the ball, the arrangement being such that the axis of the pivot pins in the semi-spherical ends of the spindle and axle housing intersects the center of the said ball and means for adjusting the stub shaft longitudinally in the spindle.

4. A front wheel drive for automotive vehicles comprising an axle housing having a semi-spherical end, a wheel spindle having a semi-spherical end, a wheel mounted on the spindle, pivot pins connecting the semi-spherical ends of the axle housing and wheel spindle, a shaft rotatably mounted in the axle housing, a stub shaft rotatably mounted in the wheel spindle, a universal joint connecting the axle shaft and stub shaft, a ball socketed between the ends of the axle shaft and stub shaft and within the semi-spherical ends of the axle housing and wheel spindle, the pivot pins between the semi-spherical ends of the axle housing and wheel spindle preventing separation of the parts and means for adjusting the stub shaft toward the axle shaft to firmly engage the ball between the ends of the axle shaft and the stub shaft and the axis of the pivot pins extending through the center of the ball and at an angle toward the wheel tread.

5. A front wheel drive for automotive vehicles comprising an axle housing having a semi-spherical end, a wheel spindle having a semi-spherical end, a wheel rotatably mounted on the spindle, upper and lower pivot pins supported by the semi-spherical end of the wheel spindle and pivotally engaging the semi-spherical end of the axle housing, the axis of the pivot pins extending at an angle to the plane of the wheel, a steering arm connected to the semi-spherical end of the wheel spindle between the upper pivot pin and wheel, the lower pivot pin being formed of steel and being provided with an annular shoulder, the arrangement being such that said annular shoulder is placed under compression by the weight of the vehicle.

6. A front wheel drive for automotive vehicles comprising an axle housing having an integral semi-spherical end, a wheel spindle having an integral semi-spherical end, a wheel rotatably mounted on the wheel spindle, a tire on the wheel, pivot pins connecting the semi-spherical ends of the axle housing and wheel spindle, a shaft rotatably mounted in the axle housing, a stub shaft rotatably mounted in the wheel spindle, a universal joint connecting the axle shaft and stub shaft, a ball positioned between the ends of the axle shaft and stub shaft and within the semi-spherical ends of the axle housing and wheel spindle, means for adjusting the stub shaft toward the axle shaft to maintain engagement thereof with the ball the axis of the pivot pins extending at an angle to the plane of the wheel.

7. A front wheel drive for automotive vehicles comprising an axle housing having a semi-spherical end, a wheel spindle having a semi-spherical end, pivot pins connecting the semi-spherical ends of the axle housing and wheel spindle, a shaft rotatably mounted in the axle housing, a stub shaft rotatably mounted in the wheel spindle, a universal joint connecting the axle shaft and stub shaft, a ball positioned between the ends of the axle shaft and stub shaft and within the semi-spherical ends of the axle housing and wheel spindle and means for adjusting the stub shaft toward the axle shaft to position the center of the ball on an axial line passing between the pivot pins.

8. A front wheel drive for automotive vehicles comprising an axle housing having a semi-spherical end, an axle shaft therein, a wheel spindle having a semi-spherical end engaging over the semi-spherical end of the axle housing, a stub shaft housed by the wheel spindle, a thrust bearing carried by the axle housing and supporting the axle shaft against longitudinal movement in one direction, pivot pins supported in the semi-spherical end of the wheel spindle and pivotally engaging the semi-spherical end of the axle housing, a universal joint connecting the axle shaft and stub shaft including a ball engaged by the opposed ends of the axle shaft and stub shaft, and means for adjusting the stub shaft in the wheel spindle to secure working engagement of the stub and axle shafts with the said ball and preventing longitudinal movement of the wheel spindle in respect to the axle housing, the said ball being maintained with its center on an axial line passing between the pivot pins.

9. In a front wheel drive for automotive vehicles, an axle housing having a semi-spherical end, a wheel spindle having a semi-spherical end within which the semi-spherical end of the axle housing is positioned, upper and lower axially aligned pivot pins mounted in the semi-spherical end of the wheel spindle, bearing members carried by the semi-spherical end of the axle housing and engaging the inner ends of the pivot pins, a wheel carried by the said wheel spindle and having a tire, the extended axis of the pivot pins intersecting the tire adjacent the road surface, the lower pivot pin having a portion insertible in an aperture provided therefor in the semi-spherical end of the wheel spindle, and an integral shoulder engaging the inner surface of the said semi-spherical end of the wheel spindle providing a rigid support for the load imposed thereon by the axle housing.

10. A front wheel drive for automotive vehicles comprising an axle housing having a semi-spherical end, an axle shaft therein, a wheel spindle having a semi-spherical end engaging over the semi-spherical end of the axle housing, a stub shaft housed by the wheel spindle, a wheel and a tire supported by the spindle, pivot pins supported in the semi-spherical end of the wheel spindle and pivotally engaging the semi-spherical end of the axle housing, a universal joint connecting the axle shaft and stub shaft positioned within the semi-spherical end of the axle housing, the center point of the universal joint being at one side of the plane occupied by the inner side of the wheel and the axial line extending between the pivot pins passing through the center of the universal joint and intersecting the tire adjacent the road surface, and adjustable means preventing relative longitudinal movement of the axle shaft and the stub shaft to constantly maintain the turning center of the universal joint on the axial line extending between the pivot pins.

KARL D. KYSOR.